US008661513B2

(12) United States Patent
Hochmuth et al.

(10) Patent No.: US 8,661,513 B2
(45) Date of Patent: Feb. 25, 2014

(54) SELECTION AND APPLICATION OF ROLES AND SYSTEMS BASED ON USERNAME AND LAYOUT ID

(75) Inventors: Roland M. Hochmuth, Ft. Collins, CO (US); Byron A. Alcorn, Fort Collins, CO (US); Jeffrey Joel Walls, Fort Collins, CO (US); Thomas J. Flynn, Magnolia, TX (US); Quoc P. Pham, Spring, TX (US); Valentin Popescu, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1297 days.

(21) Appl. No.: 12/209,953

(22) Filed: Sep. 12, 2008

(65) Prior Publication Data
US 2010/0071042 A1 Mar. 18, 2010

(51) Int. Cl.
G06F 7/04 (2006.01)
G06F 15/16 (2006.01)
G06F 17/30 (2006.01)
H04L 29/06 (2006.01)

(52) U.S. Cl.
USPC ............... 726/7; 715/733; 715/740; 715/741; 715/745; 715/747

(58) Field of Classification Search
None
See application file for complete search history.

(56) References Cited

U.S. PATENT DOCUMENTS

| 8,286,082 B2 * | 10/2012 | Mazzaferri | 715/734 |
|---|---|---|---|
| 2004/0117799 A1 * | 6/2004 | Brockway et al. | 719/310 |
| 2005/0068252 A1 * | 3/2005 | Driver et al. | 345/1.1 |
| 2006/0168526 A1 * | 7/2006 | Stirbu | 715/740 |
| 2007/0171921 A1 * | 7/2007 | Wookey et al. | 370/401 |
| 2008/0189628 A1 * | 8/2008 | Liesche et al. | 715/762 |
| 2009/0106662 A1 * | 4/2009 | Ye et al. | 715/740 |
| 2009/0287832 A1 * | 11/2009 | Liang et al. | 709/228 |

* cited by examiner

Primary Examiner — Nadia Khoshnoodi

(57) ABSTRACT

In one embodiment a computing system comprises one or more processors, a display device coupled to the computing system, and a memory module communicatively connected to the one or more processors. The memory module comprises logic to receive, in a connection server, a service request from a user via a remote connection client, wherein the service request comprises at least one of a user credential, a connection client identifier, and a layout identifier, authenticate, in the connection server, the user credential and the connection client identifier, retrieve, in the connection server, a user profile associated with the user, a connection client layout associated with the layout identifier, connection data for at least one remote system, and a policy associated with the user profile, and transmit the user profile, the connection client layout, a remote system and the connection data for a remote system and a policy associated with the user profile from the connection server to the remote connection client.

18 Claims, 4 Drawing Sheets

405 — Users Table

| UserId | Username | GroupId |
|---|---|---|
| 1 | Joe | 1 |
| 2 | Sally | 2 |

410 — Profile to User Table

| UsertoProfileId | UserId | ProfileId |
|---|---|---|
| 1 | 1 | 1 |
| 2 | 1 | 2 |
| 3 | 2 | 3 |

415 — Profiles Table

| ProfileId | ProfileName |
|---|---|
| 1 | High |
| 2 | Low |
| 3 | Medium |

400

420 — System to Profile Table

| SystemToProfileId | SystemId | ProfileId | PolicyId |
|---|---|---|---|
| 1 | 1 | 1 | 1 |
| 2 | 2 | 1 | 2 |

425 — Pool to Profile Table

| PoolToProfileId | PoolId | ProfileId | PolicyId |
|---|---|---|---|
| 1 | 1 | 2 | 1 |
| 2 | 2 | 2 | 2 |
| 3 | 2 | 3 | 1 |
| 3 | 2 | 3 | 2 |

430 — Systems Table

| SystemId | HostName |
|---|---|
| 1 | Blade1 |
| 2 | Blade2 |
| 3 | Blade3 |
| 4 | Blade4 |
| 5 | Blade5 |
| 6 | Blade6 |

Fig. 4

435 — Pools Table

| PoolId | PoolName |
|---|---|
| 1 | PoolA |
| 2 | PoolB |

440 — Pool to Systems Table

| PooltoSystemsId | PoolId | SystemId |
|---|---|---|
| 1 | 1 | 3 |
| 2 | 1 | 4 |
| 3 | 2 | 5 |
| 4 | 2 | 6 |

445 — Policies Table

| PolicyId | x | y | width | height | IsUsEnabled |
|---|---|---|---|---|---|
| 1 | 0 | 0 | 1280 | 1024 | true |
| 2 | 1280 | 0 | 1280 | 1024 | true |
| 3 | 0 | 0 | 1280 | 1024 | true |

SELECTION AND APPLICATION OF ROLES AND SYSTEMS BASED ON USERNAME AND LAYOUT ID

BACKGROUND

Connection management systems may comprise client/server applications that connect a user to a single remote system. A connection management system that allows for more flexibility in the number of remote systems a user can connect to and the manner in which the remote systems are displayed would find utility.

BRIEF DESCRIPTION OF THE DRAWINGS

FIG. 4 is a schematic illustration of a user profile for implementing multiple connections through a connection management system, according to embodiments.

DETAILED DESCRIPTION

Described herein are exemplary systems and methods which may be used to implement multiple connections through a connection management system. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Figure 1:
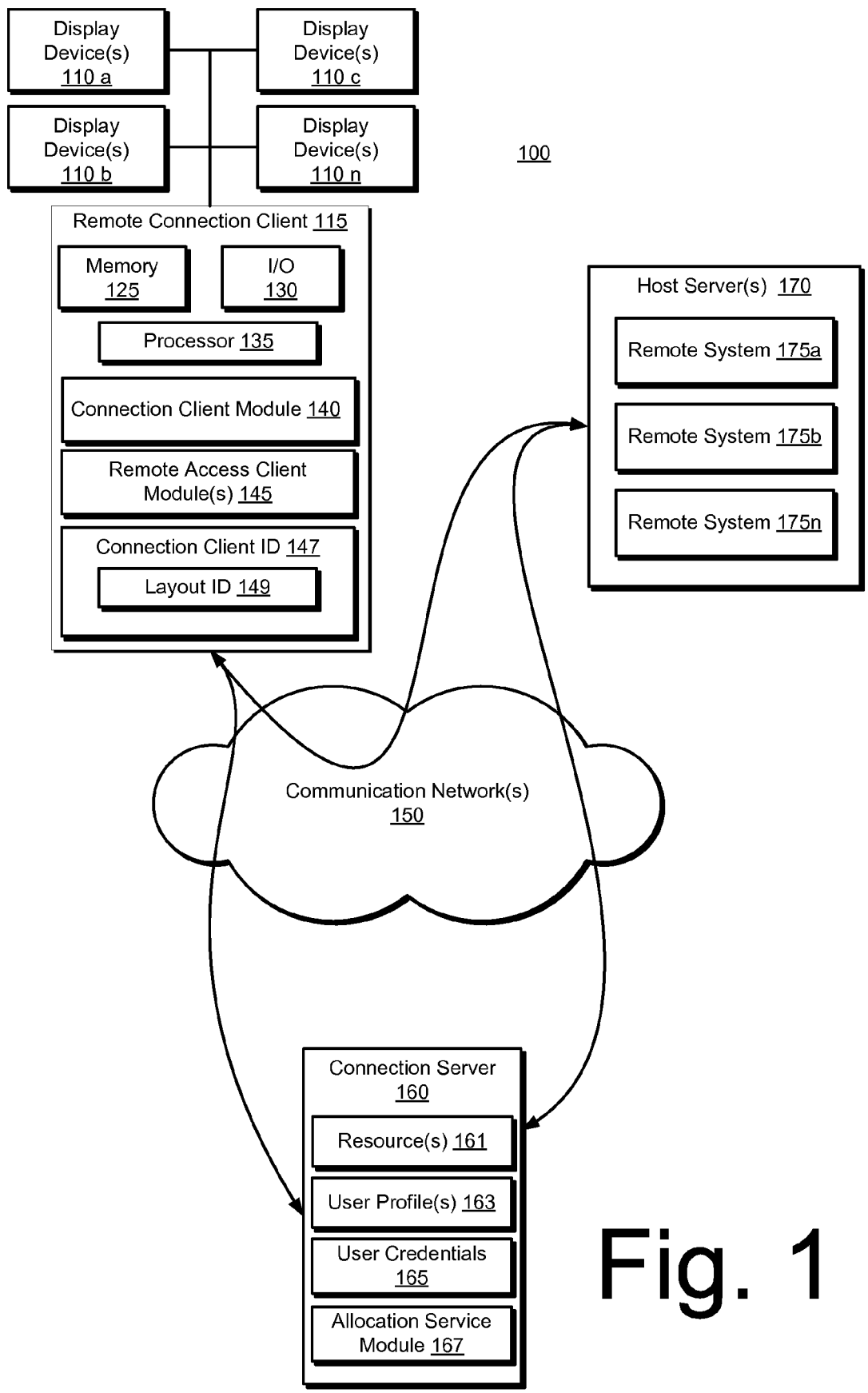
FIG. 1 is a schematic illustration of a connection management system computing environment in which multiple connections may be implemented, according to embodiments.

FIG. 1 is a schematic illustration of connection management system computing environment 100 in which multiple connections may be implemented, according to embodiments. The networked computing environment 100 is intended to illustrate a client-server network configuration, and may represent a computing environment that spans a corporate or college campus, a city, or an entire geographic region.

Computing environment 100 comprises a remote connection client 115, a connection server 160, and at least one host server 170 communicatively coupled by at least one communication network 150. In the embodiment depicted in FIG. 1, connection server 160 comprises resources 161 such as, e.g., applications, storage, or other resources. In some embodiments, connection server 160 may comprise at least one user profile 163, and at least one user credentials 165. By way of example and not limitation, a user profile 163 is presented in FIG. 4 and discussed in more depth below. Servers 160 and 170 need not be centrally located. Servers 160 and 170 may be physically remote from one another and maintained separately.

In some embodiments, a remote connection client 115 may comprise; a memory module 125, an input/output module 130, a processor 135, a connection client module 140, a remote access client module 145, and a connection client identifier 147. In some embodiments, the connection client identifier 147 may comprise among other components a layout identifier 149. Furthermore, the remote connection client 115 may be coupled to at least one display device 110a, 110b, 110c and 110n. At least one remote connection client 115 may communicate with connection server 160 via a communication network 150. Each remote connection client 115 in the computing environment 100 may be implemented as a fully functional client computer, or as a thin client computing device as depicted in FIG. 1.

Thin client computing devices have become more popular among IT organizations. Compared to fully functional client computers, thin client computing devices may have only a relatively small amount of system memory 125 and a relatively slow processor 135. In some embodiments, the processor 135 may be a graphics processor. Thin clients provide several advantages over fully functional client computers. For example, thin clients may be more reliable than their fully functional client computers, which in turn may reduce maintenance costs.

In some embodiments, a connection client module 140 may comprise software to run on a remote connection client 115. The connection client module 140 may communicate with a connection server 160 and receive a list of remote systems 175a, 175b ... 175n with which the remote connection client 115 may connect. Furthermore, a connection client module 140 may create connections with the remote systems 175a, 175b ... 175n by controlling various remote access client modules 145.

In some embodiments, a remote access client module 145 may comprise software to run on a remote connection client 115. The remote access client module 145 may allow a computing system to communicate with a remote system by managing connection properties and parameters. In some embodiments, the connection client module 140 runs on a remote connection client and provides a user interface through which a user may create remote desktop sessions.

In operation, when a user selects to connect using the connection client module then the connection client module 140 receives a username of the user and transmits this to the allocation service module 167 along with a unique connection client identifier 147 of the remote connection client 115. The allocation service returns to the connection client module 140 the remote systems 175a, 175b, ... 175n that are allocated to the user along with the settings that should be applied to the remote access client module 145. The settings may include the layout of the remote desktop sessions. The connection client module 140 may then create one or more remote desktop sessions using the remote access client module 145 and position the sessions according to the layout settings supplied by the allocation service module 167.

In some embodiments, a connection client identifier 147 may comprise a unique identifier for each computing device, protocols used between a connection client module 140 and an allocation service module 167, profiles, and layout settings.

Remote connection client 115 and servers 160 and 170 are connected to a communication network 150. These connections may be implemented as a Personal Area Network (PAN), Local Area Network (LAN), Metropolitan Area Network (MAN), a Wide Area Network (WAN) or the like. Furthermore, communication network 150 may comprise one or more sub-networks. By way of example, and not by limitation, communication network 150 may comprise one or more wireless access points (WAPs) that establish a wireless network, which is coupled to a LAN or directly to a backbone network such as the Internet. Additionally, the communication network 150 may include a variety of input/output transports such as, but not limited to wired USB or serial links, Wireless 802.11x link, wireless USB, Blue-tooth, infra red link or the like.

In some embodiments, connection server 160 may contain among other resources, at least one user profile 163, at least one user credentials 165 and an allocation service module 167. By way of example and not limitation, a user profile is presented in FIG. 4 and is discussed in more depth below.

By way of example and not limitation, an allocation service module 167 may run as a network service on a connection server 160 connected to a network. In some embodiments, the responsibilities of the allocation service module 167 may include allocating remote systems 175a, 175b . . . 175n to the user and supplying a user's settings for the remote access client.

In operation, when the allocation service module 167 receives a request from a connection client module 140 for a new session the allocation service module 167 evaluates the remote systems 175a, 175b . . . 175n that the user could connect to and the settings that could be applied to the remote access client module 145 based on the supplied connection client identifier 147 and layout identifier 149. The settings include layout information that may be used by the connection client module 140 to position the remote desktop sessions created by the remote access client module 145 on the physical displays 110a, 110b, 110c . . . 110n connected to the remote connection client 115. In some embodiments, the allocation service module 167 may also have an administration console that may be used to configure the allocation service module 167.

In some embodiments, a host server 170 may comprise at least one remote system 175a, 175b . . . 175n. In some embodiments, the remote systems 175a, 175b . . . 175n may comprise blades coupled to the host server 170.

In operation, a user may elect to connect via the client connection module 140 to one or more remote systems 175a, 175b . . . 175n. The connection client module 140 may prompt the user for their username/credentials. The connection client module 140 may send a request to the connection server 160 along with the user's credentials. The connection server 160 may determine if the user has one or more profiles 163. If the user has one profile 163, the connection server 160 may determine the remote systems 175a, 175b . . . 175n that the user can connect to and the properties/policies that should be used for each connection. If systems are dynamically assigned an available remote system may be determined out of a pool of remote systems 175a, 175b . . . 175n. If remote systems 175a, 175b . . . 175n are statically assigned to a user, those remote systems 175a, 175b . . . 175n may be returned. The properties also may include information on what remote access client module 145 to use for each connection and potentially the window position, width, and height for each connection as well as any other properties/settings that can be specified in the remote access client, such as "IsUsbEnabled". The connection server 160 may send this information back to the connection client module 140. The connection client module 140 may then start up the specified remote access client modules 145 and initiate connections to each remote system using the supplied properties.

By way of example and not limitation, the above discussed remote connection client 115 may allow a user to connect to multiple remote systems contemporaneously and may allow the simultaneous use of multiple remote access modules 145. Furthermore, properties for each connection may be individually applied for each connection. In some embodiments, a connection may be routed through a connection server 160. In some embodiments, a connection between a remote system and computing system may be established across a communication network 150.

By way of example and not limitation, in a scenario in which two computing devices 115 may be contemporaneously used by a user to support more displays 110a, 110b, 110c . . . 110n than can be handled by a single remote connection client 115, a layout identifier 149 may be considered relative to the remote connection client 115. I.e. the displays 110a, 110b, 110c . . . 110n may have the same layout, but relative to the end-user, the remote connection clients 115 are to be contemporaneously used, and therefore the layout identifier 149 needs to factor into the final display layout for the multiple computing devices 115 with multiple displays 110a, 110b, 110c . . . 110n. By way of example and not limitation, given eight displays 110a, 110b, 110c . . . 110n that are to be arranged in a 4×2 configuration each with a display resolution of 1280×1024 the friendly names for the layout identifier 149 may be Left_4×2_5120×2056 and Right_4×2_5120×2056 if the left and right remote connection clients 115 each have four displays 110a, 110b, 110c . . . 110n attached and arranged in a 2×2 configuration. Continuing with this example, when the user connects from the left remote connection client 115, the connection client identifier 147 may be sent to the allocation service module 167. The allocation service module 167 may convert the connection client identifier 147 into a layout identifier 149 of Left_4×2_5120× 2056. The allocation service module 167 may determine the systems/profiles and layout of the sessions that the connection client module 140 running on that remote connection client 115 should connect to based on a username and an evaluated layout identifier 149. Similarly, for the remote connection client 115 on the right side. Because the systems/profiles that are selected are based on the username and layout identifier 149, the systems/profiles and settings returned to the connection client module 140 running on the left and right remote connection clients 115 can be different.

In other embodiments, where the user has only one set of profiles/systems assigned to them, the user may not need to be prompted to select the profile and the systems and settings returned to the connection client module, but rather they may be automatically provided. One variation on this embodiment may be where a user may have multiple profiles assigned to them. In such an embodiment, the profiles assigned to the user may be returned to the connection client module 140 and the user may select which profile they would like to use.

By way of example and not limitation, in a remote desktop session allocation system one or more "remote desktop sessions" may be allocated to users. The users access remote desktop sessions from a remote connection client 115 running a connection client module 140 which may use one or more instances of a remote access client module 145. The remote connection client 115 has one or more displays 110a, 110b, 110c . . . 110n attached to it. For example, the remote connection client 115 may have two displays 110a, 110b organized in a horizontal (left to right) or vertical (top to bottom) format. Additionally, each display 110 may have a display resolution that has been configured by an administrator, such as 1280×1024.

In operation, remote desktop sessions created using the remote access client modules may need to be positioned on the physical displays 110a, 110b, 110c . . . 110n connected to the remote connection client 115 according to the users' settings and the physical organization of the displays. Additionally, if a user "hot-desks" to multiple remote connection clients 115 with a different physical display 110 organization, the users' settings for the layout of the remote desktop sessions may be specified based on a username and physical organization of the displays attached to the remote connection client 115 as described by a connection client identifier 147. For example, if a user uses the connection client module 140 from a remote connection client 115 with two displays 110 horizontally organized, and two remote desktop sessions are assigned to the user, session one may be displayed on the left display 110a and session two displayed on the right display 110c. Next, if a user connects using another remote connection client 115 with two displays 110 that are vertically organized then the preferred layout may be session one on the top display 110a and session two on the bottom display 110b. The application of these settings may be automatically selected and applied with little to no user intervention necessary through the connection client identifier 147.

Furthermore, multiple remote connection clients 115 may be contemporaneously used by a single user or a user may require more displays 110a, 110b, 110c . . . 110n than can be physically connected to a single remote connection client 115. For example, if the user requires eight displays 110a, 110b, 110c . . . 110n, but a maximum of four displays can be connected to a single remote connection client 115; two remote connection clients 115 may be required. In such an embodiment, assignment of the systems that a user connects to and the layout settings for the remote desktop sessions may be based on the connection client identifiers and user username.

Figure 2:
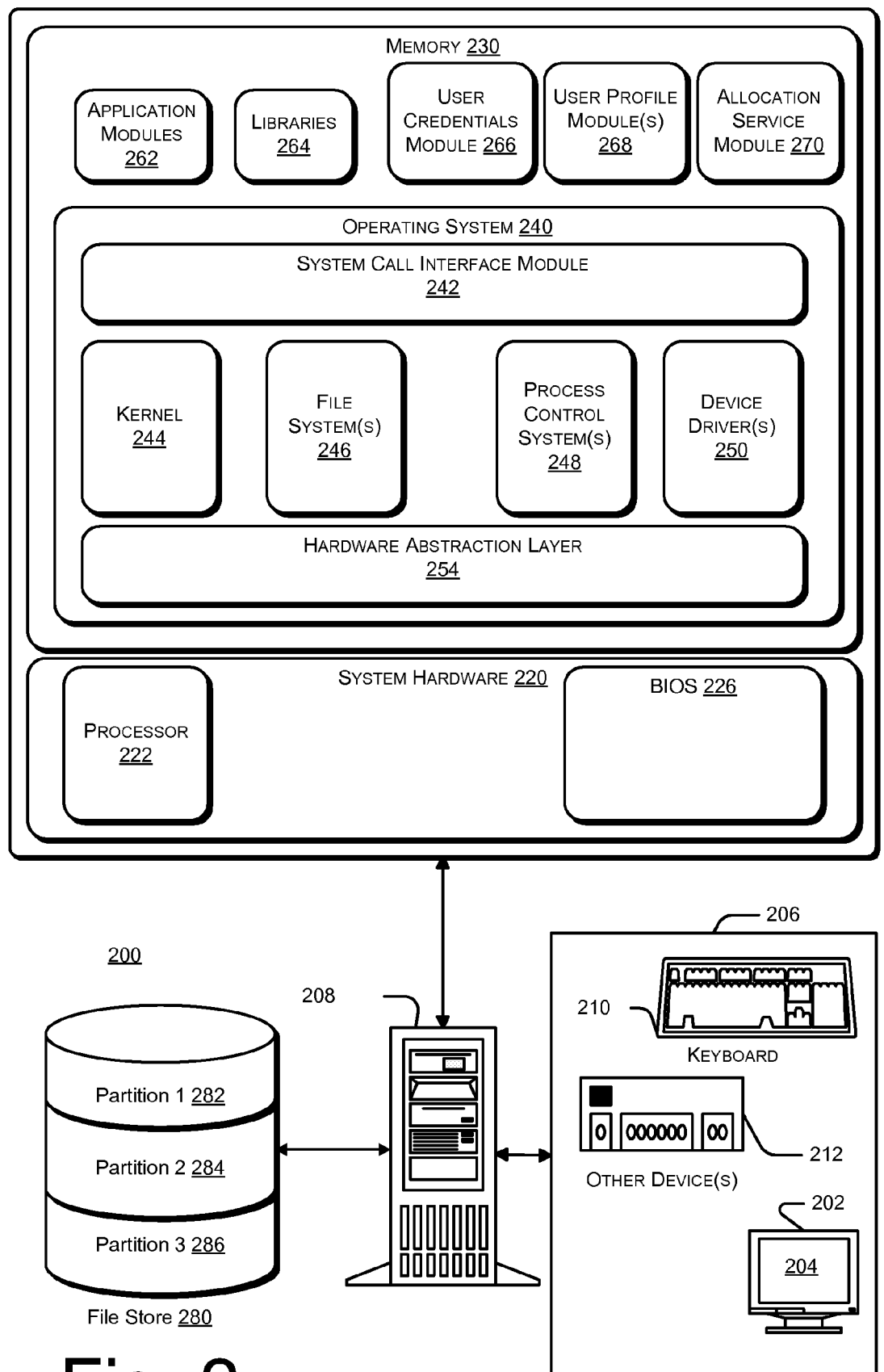
FIG. 2 is a schematic illustration of a connection server, according to embodiments.

FIG. 2 is a schematic illustration of a connection server 200 adapted to implement multiple connections through a connection management system, according to embodiments. The connection sever 200 includes a computing engine 208 and possibly one or more accompanying input/output devices 206 including, but not limited to, a display 202 having a screen 204, a keyboard 210, and other I/O device(s) 212. The other device(s) 212 may, by way of example, and not by limitation, include a touch screen, a voice-activated input device, a track ball, a mouse and any other device that allows the connection server 200 to receive input from a developer and/or a user.

The computing engine 208 includes system hardware 220 commonly implemented on a motherboard and at least one auxiliary circuit board. System hardware 220 includes a processor 222 and a basic input/output system (BIOS) 226. BIOS 226 may be implemented in flash memory and may comprise logic operations to boot the computing engine 208 and a power-on self-test (POST) module for performing system initialization and tests. In operation, when activation of computing engine 208 begins processor 222 accesses BIOS 226 and shadows the instructions of BIOS 226, such as power-on self-test module, into operating memory. Processor 222 then executes power-on self-test operations to implement POST processing.

Connection server 200 further includes a file store 280 communicatively connected to computing engine 208. File store 280 may be internal such as, e.g., one or more hard drives, or external such as, e.g., one or more external hard drives, network attached storage, or a separate storage network. In some embodiments, the file store 280 may include one or more partitions 282, 284, 286.

Memory 230 includes an operating system 240 for managing operations of computing engine 208. In one embodiment, operating system 240 includes a hardware abstraction layer 254 that provides an interface to system hardware 220. In addition, operating system 240 includes a kernel 244, one or more file systems 246 that manage files used in the operation of computing engine 208 and a process control subsystem 248 that manages processes executing on computing engine 208. Operating system 240 further includes one or more device drivers 250 and a system call interface module 242 that provides an interface between the operating system 240 and one or more application modules 262 and/or libraries 264. The various device drivers 250 interface with and generally control the hardware installed in the computing system 200.

In operation, one or more application modules 262 and/or libraries 264 executing on computing engine 208 make calls to the system call interface module 242 to execute one or more commands on the computer's processor. The system call interface module 242 invokes the services of the file systems 246 to manage the files required by the command(s) and the process control subsystem 248 to manage the process required by the command(s). The file system(s) 246 and the process control subsystem(s) 248, in turn, invoke the services of the hardware abstraction layer 254 to interface with the system hardware 220. The operating system kernel 244 can be generally considered as one or more software modules that are responsible for performing many operating system functions.

The particular embodiment of operating system 240 is not critical to the subject matter described herein. Operating system 240 may, for example, be embodied as a UNIX operating system or any derivative thereof (e.g., Linux, Solaris, etc.) or as a Windows® brand operating system or another operating system.

In some embodiments, connection server 200 may comprise at least one user credentials module 266, at least one user profile module 268, and an allocation service module 270, which may comprise operational logic and may include or invoke hardware that can communicate with at least one remote device. In the embodiment depicted in FIG. 2, system memory 230 includes at least one user credentials module 266, at least one user profile module 268 and at least one allocation service module 270. By way of example and not limitation, a user profile is presented in FIG. 4 and is discussed in more depth below. Operations implemented using the user credentials module 266, user profile module 268, and allocation service module 270 will be discussed in greater detail below, with reference to FIG. 3.

In operation, a user on a remote connection client 115 may connect to a connection server 200. The user may provide credentials to authorize access to remote systems. These credentials may be checked against user credentials module 266 to determine if the user may be granted access. Once a user has been authorized, a user may select from at least one user profile 268 stored on the connection server. An example user profile is profiled in FIG. 4 and further discussed below. Once a user has selected a user profile, the connection server 200 may send connection data to the user remote connection client 115. This connection data may allow the remote connection client 115 to access at least one remote system 175. In some embodiments, remote systems 175 may be blades in a host server 170.

Figure 3:
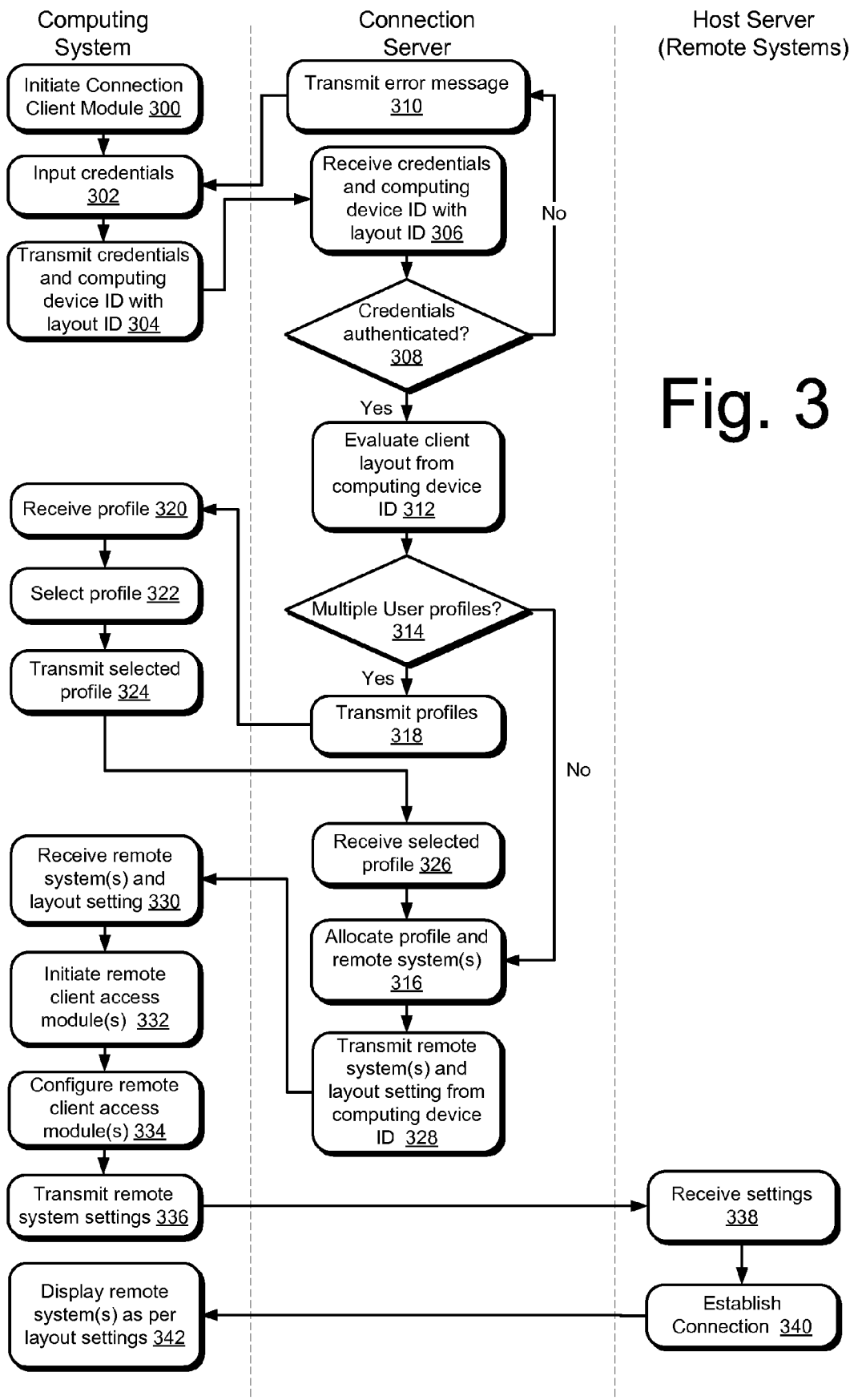
FIG. 3 is a flowchart illustrating operations implementing multiple connections through a connection management system to a connection client with a specified display layout, according to embodiments.

FIG. 3 is a flowchart illustrating operations implementing multiple connections through a connection management system to a connection client with a specified display layout, according to embodiments. Referring to FIG. 3, at operation 300 a connection client module is initiated. In some embodiments, a connection client module 140 may run as software on a user computing system, such as a remote connection client 115 depicted in FIG. 1. In some embodiments, a user may initiate the connection client module 140. In some embodiments, the connection client module 140 may be initiated automatically during the computing device start up or the like. At operation 302, a user may input credentials. In some embodiments, the user credentials may be used to determine whether a user may gain access to remote systems. At operation 304, once the user credentials have been inputted, the credentials along with a connection client identifier, comprises, among other components, a layout identifier, are transmitted to a connection server, such as the connection server 160 depicted in FIG. 1.

At operation 306, the user credentials along with a connection client identifier, comprising, among other components, a layout identifier, are received in a connection server. At operation 308, the connection server authenticates the inputted user credentials. If at operation 308, the user credentials are insufficient, at operation 310 an error message is transmitted to inform the user that access has not been granted. By contrast, if at operation 308 the user credentials are sufficient, then at operation 312 the connection server evaluates the client connection client identifier to determine the client display layout and retrieves at least user profile or role.

If at operation 314, the connection server 160 has retrieved more than one user profile then a list of the retrieved user profiles is transmitted to the user remote connection client 115, at operation 318. At operation 320, the user profiles are received in the remote connection client 115 and at operation 322 a user may select the profile or role he or she wishes to use. At operation 324, the selected user profile is transmitted to the connection server 160. At operation 326, the selected user profile is received by the connection server 160.

By contrast, if at operation 314, the connection server 160 retrieves only one profile, then the connection server 160 retrieves connection data for the known number of remote systems assigned to the retrieved user profile at operation 316. In some embodiments, if a user has not created or been assigned a specific profile, a default profile may be transmitted to the computing device. In some embodiments, remote systems may be statically assigned, while in other embodiments remote systems may be dynamically assigned. If systems are dynamically assigned at least one available remote system may be determined out of a pool of remote systems. If remote systems are statically assigned to a user, those remote systems may be returned. An example of information stored in a user profile is presented in FIG. 4 and is discussed below. Policies for remote systems may include information on what remote access client module to use for each connection and potentially the window position, width, and height for each connection as well as any other properties/settings that can be specified in the remote access client, such as "IsUsbEnabled". The number of available remote systems and their associated policies may be communicated to the remote connection client. At operation 328, the connection server 160 transmits connection data for the selected remote systems and layout settings for the remote connection client displays.

At operation 330, the remote connection client receives connection data for the selected remote systems and layout settings for the computing device displays. At operation 332, at least one remote client access module is initiated. In some embodiments, different remote systems may use different remote client access modules.

At operation 334, remote client access module configures the computing system to connect to at least one remote system. In some embodiments, the connection client module may start up the specified remote access client modules and initiate connections to each remote system using the supplied properties and policies. At operation 336, remote system connection data and settings are transmitted to at least one remote system by at least one remote client access module.

At operation 338, at least one remote system receives connection data from at least one remote access client module. In some embodiments, the connection data may be transmitted through a connection server. In some embodiments, a connection between a remote system and computing system may be established across a communication network. At operation 340, a connection is established with at least one remote system.

At operation 342, at least one remote system is displayed on a user computing system by the remote access client module. The display layout may be determined through the connection client identifier. In some embodiments, the user profile determines display characteristics and the like for the remote system of the user computing device. An example of information contained in a user profile is presented in FIG. 4 and is discussed further below.

FIG. 4 is a schematic illustration of data contained in a user profile for implementing multiple connections through a connection management system, according to embodiments. A user profile 400, may comprises multiple tables, such as but not limited to; User Table 405, Profile to User Table 410, Profiles Table 415, System to Profile Table 420, Pool to Profile Table 425, Systems Table 430, Pools Table 435, Pool to Systems Table 440, and Policies Table 545. The user profile depicted in FIG. 4 is meant as an illustration of a data organization structure and is not intended to limit the scope of the subject matter described and claimed herein.

Referring to FIG. 4, in the depicted example User=Joe in the Users Table 405 is assigned to profiles ProfileId=1 and ProfileId=2 in the Profile to User Table 410. If ProfileId=1 is selected by the user from the connection client module 140 by Joe, the connection server 160 will determine that two systems are assigned to ProfileId=1 from the System to Profile Table 420, which are Blade1 and Blade2, as shown in the Systems Table 430. If ProfileId=2 is selected from the connection client module 140 by Joe, the connection server 160 will determine that Joe will get two systems, one from PoolId=1 and the other from PoolId=2. If PoolId=1 there are two systems available with SystemId=3 and SystemId=4, as shown in the Pools to Systems Table 440, which correspond to Blade3 and Blade4 in the Systems Table 430. If PoolId=2 there are two systems available with SystemId=5 and SystemId=6, as shown in the Pools to Systems Table 440. So the connection server 160 may select one system from Blade3 and Blade4 and another system from Blade5 and Blade6.

The policies that may be applied to these systems are PolicyId=1 and PolicyId2 for the first and second system respectively. As depicted in FIG. 4, if Joe has a client system that has two displays connected, both with a resolution 1280× 1024 and organized in a left to right layout, the desktop for the first system will be displayed by the remote access client on the left display, based on the settings for PolicyId=1 and the desktop for the second system will be displayed on the right display based on the settings for PolicyId=2.

By way of example and not limitation, additional detail will now be provided with regards to possible formats and information associated with user profiles, properties and policies. In some embodiments, the connection client module 160, may allow multiple sessions to connect to a single client computing device sessions to be statically assigned as individual blades or roles and users to request additional resources or reconnect to existing resources.

In some embodiments, administrators may statically assign both blades and roles to a user. In the case of an assigned role, a blade resource from that role is assigned to the user when they connect using the connection client. The term on-demand resources may be implied to be those statically assigned resources not assigned to a specific client a user is logged into and all dynamic resources to which the user may have access. These on-demand resources will not be explicitly identified in the connection server management page. A global property may be added to allow unknown client computing devices to immediately connect to all statically assigned blades and private roles. If public roles are available the user may only be able to connect when the connection choice dialog is visible. Unknown client computing devices, i.e. those that are unmanaged, will follow standard policy management. If a user chooses resolution, or full screen, then all resources may be forced to match this. Furthermore, a server can override user's choice. Borders may be enabled or disabled by a user on connection client or may be over-ridden by the administrator.

A connection choice dialog may allow a user to select one or more resources with which to connect. Furthermore, a connection choice dialog may allow a user to connect to any statically assigned blades not assigned to the specific client computing device they are using or any dynamic roles that they may be allowed to use. Additionally, a connection choice dialog may not show any choices for resources currently enabled (in the connection dialog status pane) on the client computing device through the connection client module.

A connection status dialog may allow a user to change the connection status of one or more sessions and to determine connection status dialog behavior. The connection status dialog may include a Session number, Friendly name or role, and a Status such as connecting, connected, disconnected, failed, or unavailable. The status dialog may also allow a user to change the connection status of one or more sessions may include options such as selecting one or more blades or role to disconnect, disconnecting all sessions, selecting one or more blade or role to re-connect, reconnecting all sessions, adding a new connection (default is to have button disabled), enabled through a configuration file, and if a resource with a different connection status is chosen non-compatible blades may be deselected. For example if a connected blade is selected followed by selecting a disconnected blade then the first connected blade will be deselected. In some embodiments, determining the connection status dialog behavior may include a mouse crossing the hot-edge of the client display, wherein the hot-edge is programmable and can be the top, bottom, left, or right of the client display, the dialog can be centered on the virtual screen or centered on the current mouse position. These behaviors can be set in a Timer tab (which may move depending on feedback) of the connection client. The connection status dialog may also be started if an attempt is made to start a second client, the second client then exits, and any new resources added will show up in the connection status dialog status.

In some embodiments, only those sessions required by a second client will be disconnected from the first client. Additionally, the connection status dialog may be presented on the client computing device where a session is lost due to roaming. A timer may close the dialog after a configurable number of seconds. Furthermore, the connection manager may not attempt to manage connections started outside of the connection client, even if the connections were made from the same client. Connections started outside of connection manager will close, if the resources are requested by the connection client.

If a user transitions to a failover blade the following behavior will be observed: As long as the user is logged into the blade he will continue to use the failover even if the primary blade is available. The connection manager server sends the failover blade back to the client until the user logs out. Furthermore, if a logout of the failover blade occurs, then the connection manager server should choose the primary blade if it's available. Connection policies that are set before the first session starts will apply the same policies to all sessions regardless of when they are started. To change parameters users may disconnect from all active sessions.

Thus, described herein are exemplary system and methods for implementing multiple connections through a connection management system. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method for remote connection client display layout management, comprising:
receiving, in a connection server, at least one service request from a user to connect to a first remote connection client and a second remote connection client, wherein the at least one service request comprises a user credential, and a layout identifier, and wherein the first remote connection client is associated with a first set of multiple displays, and the second remote connection client is associated with a second set of multiple displays;
retrieving, in the connection server, based on the user credential and the layout identifier, a user profile which defines positioning of display data to be displayed contemporaneously over the first set of multiple displays and the second set of multiple displays; and
transmitting the user profile to the first remote connection client and the second remote connection client.

2. The method of claim 1 further comprising:
retrieving a list of at least two user profiles;
transmitting the list of at least two user profiles to the first remote connection client; and
receiving a selection signal from the first remote connection client, wherein the selection signal indicates a selected profile for the user from the list.

3. The method of claim 1, further comprising dynamically assigning to the user an available remote system from a pool of available remote systems.

4. The method of claim 1, further comprising:
initiating, in the first remote connection client, a first session for a first remote system;
establishing a connection between the first remote connection client and the first remote system; and
displaying a first remote desktop for the first remote system as determined by the user profile.

5. The method of claim 4, further comprising:
initiating, in the first remote connection client, a second session for the second remote system;
establishing a connection between the first remote connection client and second remote system; and
displaying a second remote desktop for the second remote system as determined by the user profile.

6. A connection server comprising:
one or more processors;
a memory module to store instructions that when executed by the one or more processors cause the one or more processors to:

receive, in the connection server, at least one service request from a user to connect to a first remote connection client and a second remote connection client, wherein the at least one service request comprises a user credential and a layout identifier, and wherein the first remote connection client is associated with a first set of multiple displays, and the second remote connection client is associated with a second set of multiple displays;

retrieve, in the connection server, based on the user credential and the layout identifier, a user profile which defines positioning of display data to be displayed contemporaneously over the first set of multiple displays and the second set of multiple displays; and transmit the user profile to the first remote connection client and the second remote connection client.

7. The connection server of claim 6, wherein the instructions further cause the one or more processors to:

retrieve a list of at least two user profiles;

transmit the list of at least two user profiles to the first remote connection client; and receive a selection signal indicating selection of one of the at least two user profiles from the first remote connection client.

8. The connection server of claim 6, wherein the instructions further cause the one or more processors to dynamically assign to the user an available remote system from a pool of available remote systems.

9. The connection server of claim 6, wherein the instructions further cause the one or more processors to:

receive, in the connection server, a second service request from the user via the second remote connection client, the second service request comprising the user credential and a second layout identifier;

retrieve, in the connection server, based on the user credential and the second layout identifier, a second user profile which defines positioning of second display data over the second set of multiple displays, and wherein the second display data is to be displayed over the second set of multiple displays contemporaneously with the first display data over the first set of multiple displays; and transmit the second user profile to the second remote connection client.

10. A non-transitory computer-readable medium storing instructions which, when executed by at least one processor, causes the at least one processor to:

receive, in a connection server, at least one service request from a user to connect a first remote connection client and a second remote connection client, wherein the at least one service request comprises a user credential and a layout identifier, and wherein the first remote connection client is associated with a first set of multiple displays, and the second remote connection client is associated with a second set of multiple displays;

retrieve, in the connection server, based on the user credential and the layout identifier, a user profile which defines a positioning of display data to be displayed contemporaneously over the first set of multiple displays and the second set of multiple displays; and transmit the user profile to the first remote connection client and the second remote connection client.

11. The computer-readable medium of claim 10, wherein the instructions further cause the at least one processor to:

retrieve a list of at least two user profiles;

transmit the list of at least two user profiles to the first remote connection client; and receive a selection signal indicating selection of one of the at least two user profiles from the first remote connection client.

12. The computer-readable medium of claim 10, wherein the instructions further cause the at least one processor to dynamically assign to the user an available remote system from a pool of available remote systems.

13. The computer-readable medium of claim 10, wherein the instructions further cause the at least one processor to:

initiate a session for a first remote system;

establish a connection between the first remote connection client and the first remote system; and display a remote desktop for the first remote system as determined by the user profile.

14. The computer-readable medium of claim 10, wherein the instructions further cause the at least one processor to:

receive, in the connection server, a second service request from the user via the second remote connection client, the second service request comprising the user credential and a second layout identifier;

retrieve, in the connection server, based on the user credential and the second layout identifier, a second user profile which defines positioning of second display data over the second set of multiple displays, and wherein the second display data is to be displayed over the second set of multiple displays contemporaneously with the first display data over the first set of multiple displays; and transmit the second user profile to the second remote connection client.

15. A method for remote connection client display layout management, comprising:

receiving, in a connection server, a first service request from a user via a first remote connection client, wherein the first service request comprises a user credential, and a first layout identifier, and wherein the first remote connection client is associated with a first set of multiple displays;

retrieving, in the connection server, based on the user credential and the first layout identifier, a first user profile associated with the user and a first connection client layout associated with the first layout identifier, wherein the first connection client layout defines positioning of first display data over the first set of multiple displays;

transmitting the first user profile and the first connection client layout from the connection server to the first remote connection client;

receiving, in the connection server, a second service request from the user via a second remote connection client, the second service request comprising the user credential and a second layout identifier, wherein the second remote connection client is associated with a second set of multiple displays;

retrieving, in the connection server, based on the user credential and the second layout identifier, a second user profile and a second connection client layout which defines positioning of second display data over the second set of multiple displays, and wherein the second display data is to be displayed over the second set of multiple displays contemporaneously with the first display data over the first set of multiple displays; and transmitting the second user profile and the second connection client layout to the second remote connection client.

16. The method of claim 15, wherein the first display data and the second display data represent different portions of a display configuration for the user.

17. The method of claim 16, wherein the first set of multiple displays represents a left half of the display configuration, and the second set of multiple displays represents a right half of the display configuration.

18. The method of claim 16, wherein the first set of multiple displays represents a top half of the display configuration, and the second set of multiple displays represents a bottom half of the display configuration.

* * * * *